Patented Aug. 10, 1926.

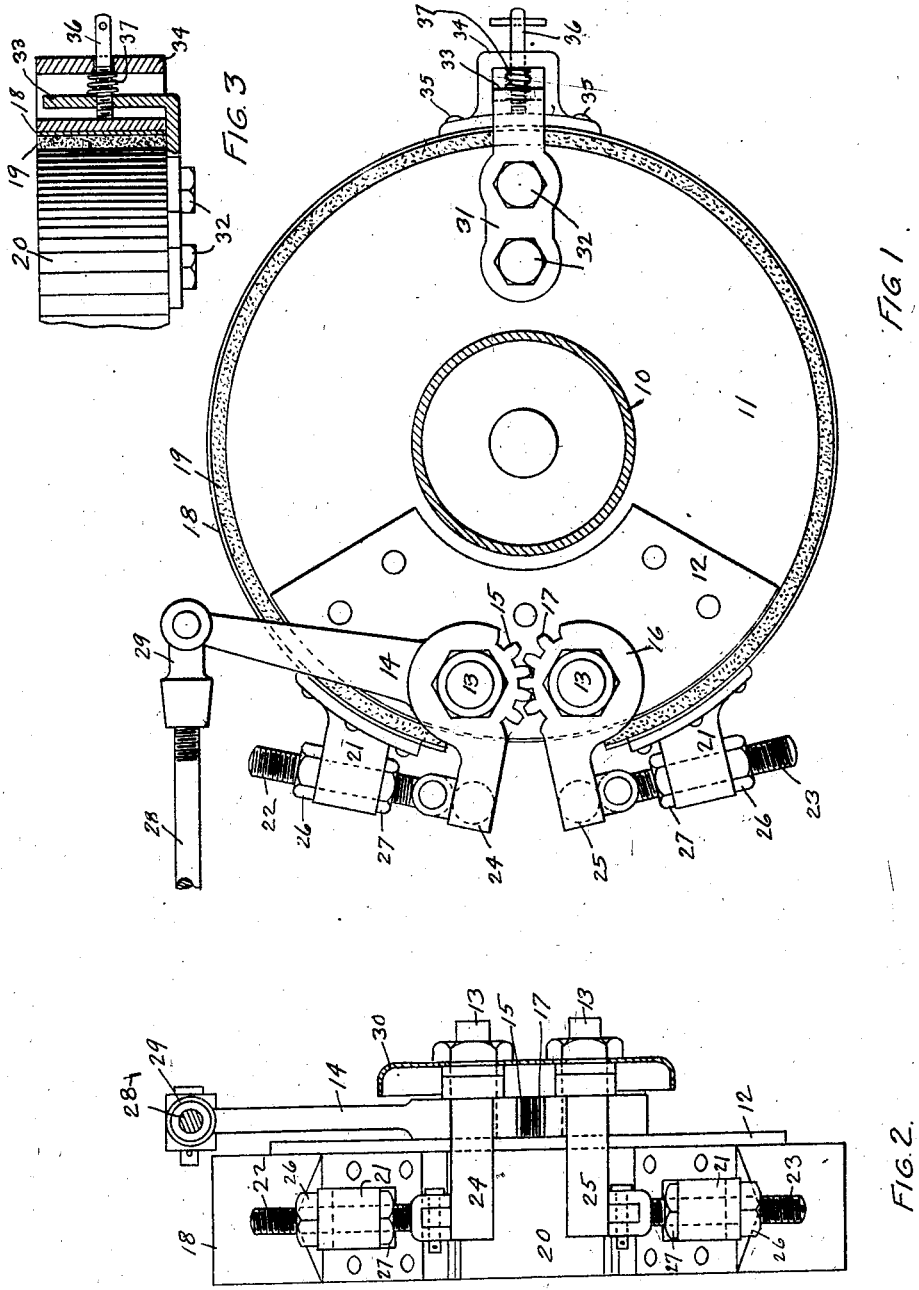

1,595,762

UNITED STATES PATENT OFFICE.

ARTHUR H. DUMBLE, OF PORTLAND, OREGON.

AUTOMOBILE BRAKE.

Application filed September 22, 1924. Serial No. 739,075.

This invention relates more particularly to a braking mechanism for automobiles.

An object of my invention is to provide an exceedingly simple and efficient brake mechanism which will be easy to manufacture and to apply to existing brake drums.

A second object is to eliminate lost motion, as far as possible, and also the undesirable results caused by lost motion in braking mechanisms.

A third object is to so apply the friction element to the drum that it shall wear evenly:—in other words, to exert a fairly uniform pressure along the entire length of the brake band rather than a maximum pressure near the points of application.

A fourth object is to rigidly support the back of the band against rotation with relation to the drum itself, and at the same time to hold this portion of the band away from the drum while the brake is not being applied.

A fifth object is to permit the band to be adjusted with greater clearance without danger of rattling or failure to function.

A sixth object is to permit the two halves of the band to be adjusted independently of each other.

I accomplish these results in the manner set forth in the following specification and illustrated in the accompanying drawing, in which:—

Figure 1 is a side elevation of the device showing its relation to the present drum and taken as a section through the rear axle housing. Figure 2 is a front elevation of Figure 1, and Figure 3 is a horizontal section through the rear end of the device showing the band supporting element.

Similar numbers of reference refer to the same parts throughout the several views.

Referring in detail to the drawing, in order to illustrate my invention I have shown Figure 1 as a section through the rear axle housing 10 on whose flanged end 11, I have riveted a plate 12.

Securely mounted on the plate 12 are the two stud bolts 13 on which are placed the bell crank lever 14 which is provided with a segment gear 15 and the lever 16, which is provided with a segment gear 17.

I have placed the usual brake band 18 and lining 19 around the drum 20. Lugs 21 are riveted to the band 18 and are joined by means of the eye bolts 22 and 23 to the arms 24 and 25 of the members 14 and 16.

Nuts 26 and 27 hold the band 18 in adjustment. The usual brake rod 28 applies power to the mechanism through the clevis 29 on the arm 14. In order to keep dirt out of the gears 15 and 17, I have provided a sheet metal cover 30 which I have removed in Figure 1 to better disclose the parts.

On the rear portion of the flange 11, I have secured an arm 31 by means of the bolts 32. The end 33 of the arm 31 is turned inwardly across the band 18 and is adapted to receive a screw. To the rear portion of the band 18, I have secured a hollow lug 34 by means of the rivets 35. The lug 34 is provided with a free hole for the screw 36, which is threaded into the tapped hole in the member 33 and is provided with a spring 37.

It will be understood that the arms 24 and 25 will be overhung to bring them in line with the drum center. It must also be understood that the style of plate 12 and the manner of mounting the studs 13 on the flange 11 may be varied greatly, depending upon the type of car being fitted, without departing from the spirit of my invention.

The operation of the brake is as follows: Power is applied through the rod 28 to the lever 14 which actuates the gears 15 and 17 whose levers 24 and 25 pull the ends of the band 18 down toward each other in a circular path closely following the shape of the band itself, thereby insuring an extremely even application of the brake, not only under the fastenings as is ordinarily the case, but along its entire circumference.

Since the rear of the band is urged away from the drum by the spring 37 it is evident that any releasing of the pull on the rod 28 will insure a completely uniform release of the pressure along the entire band.

I am aware that many forms of brakes have been constructed in the past, I therefore do not claim such devices broadly, but I do intend to cover all such modifications thereof as fall fairly within the appended claim.

I claim:

In a brake mechanism, the combination of a stationary axle housing; a brake drum rotatably mounted alongside of said housing; a pair of meshed segment gears mounted on said housing, each of said gears having an outwardly pointing arm formed thereon; a brake band around said drum; a radially slotted bracket secured on the back of said band; an arm rigidly mounted on said housing passing through said slot adapted to permit said band to move radially; a spring adapted to urge the rear portion of said band away from said drum; and means for adjustably attaching each end of said band to one of said levers independently of its other end, the fastening ends of said band moving in circular paths, the centers of which are inside of said brake band.

ARTHUR H. DUMBLE.